US008830242B2

(12) United States Patent
DiVerdi et al.

(10) Patent No.: US 8,830,242 B2
(45) Date of Patent: Sep. 9, 2014

(54) REALISTIC REAL-TIME SIMULATION OF BRUSH BEHAVIOR

(75) Inventors: Stephen J. DiVerdi, Mountain View, CA (US); Sunil Hadap, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1300 days.

(21) Appl. No.: 12/261,801

(22) Filed: Oct. 30, 2008

(65) Prior Publication Data

US 2011/0181618 A1 Jul. 28, 2011

(51) Int. Cl.
| | |
|---|---|
| *G06T 13/00* | (2011.01) |
| *G06F 3/038* | (2013.01) |
| *G06F 3/0484* | (2013.01) |
| *G06F 3/0354* | (2013.01) |
| *G06T 11/00* | (2006.01) |

(52) U.S. Cl.
CPC ............ *G06F 3/04845* (2013.01); *G06F 3/038* (2013.01); *G06F 3/03545* (2013.01); *G06T 11/001* (2013.01)
USPC ........................................................ 345/473

(58) Field of Classification Search
None
See application file for complete search history.

(56) References Cited

U.S. PATENT DOCUMENTS

| | | | |
|---|---|---|---|
| 4,633,416 A | 12/1986 | Walker | |
| 5,155,813 A * | 10/1992 | Donoghue et al. | ............ 345/179 |
| 5,347,620 A | 9/1994 | Zimmer | |
| 5,646,650 A * | 7/1997 | Miller et al. | ................... 345/179 |
| 5,767,843 A | 6/1998 | Wagner et al. | |
| 5,767,860 A | 6/1998 | Zimmer et al. | |
| 6,195,100 B1 * | 2/2001 | Tibbett | .......................... 345/581 |
| 6,587,587 B2 * | 7/2003 | Altman et al. | ................. 382/181 |
| 6,603,463 B1 * | 8/2003 | Rising, III | ...................... 345/179 |
| 7,158,138 B1 * | 1/2007 | Bronskill et al. | ............. 345/441 |
| 7,187,378 B2 * | 3/2007 | Su et al. | .......................... 345/419 |
| 7,239,329 B2 | 7/2007 | Bixler et al. | |
| 7,511,703 B2 * | 3/2009 | Wilson et al. | .................. 345/175 |
| 7,817,162 B2 * | 10/2010 | Bolick et al. | .................. 345/592 |
| 2008/0170069 A1 * | 7/2008 | Gibbs et al. | .................... 345/419 |

OTHER PUBLICATIONS

Lee, J.; , "Simulating oriental black-ink painting," Computer Graphics and Applications, IEEE , vol. 19, No. 3, pp. 74-81, May/Jun. 1999.*
Laerhoven et al., "Brush up your painting skills", The Visual Computer, vol. 23, Nos. 9-11, 763-771.*
Jeng-sheng Yeh; Ting-yu Lien; Ming Ouhyoung; , "On the effects of haptic display in brush and ink simulation for Chinese painting and calligraphy," Computer Graphics and Applications, 2002. Proceedings. 10th Pacific Conference on , 2002.*

(Continued)

*Primary Examiner* — Daniel Hajnik
(74) *Attorney, Agent, or Firm* — Wolfe-SBMC

(57) ABSTRACT

A method, system, and computer-readable storage medium are disclosed for simulating brush behavior. In one embodiment, user input may be received to modify an image using a brush model, wherein the brush model comprises data stored in a memory of a computer system. The brush model may comprise a plurality of bristle representations. The user input may comprise a motion of the brush model. An effect of each of the plurality of bristle representations on the image throughout the motion may be determined. The image may be modified based on the determined effect of each of the plurality of bristle representations on the image throughout the motion.

30 Claims, 5 Drawing Sheets

(56) References Cited

OTHER PUBLICATIONS

William V. Baxter, et al., "A Versatile Interactive 3D Brush Model," Proceedings of the 12th Pacific Conference on Computer Graphics and Applications (PG'04), IEEE, 10 pages, 2004.

Russell Smith, "Open Dynamics Engine," v0.5 User Guide, Feb. 23, 2006, 70 pages.

Chu, et al., "Real-Time Painting with an Expressive Virtual Chinese Brush," IEEE, Sep./Oct. 2004, 10 pages.

Xu, et al., "Advanced Design for a Realistic Virtual Brush," The Eurographics Association and Blackwell Publishers 2003, 10 pages.

\* cited by examiner

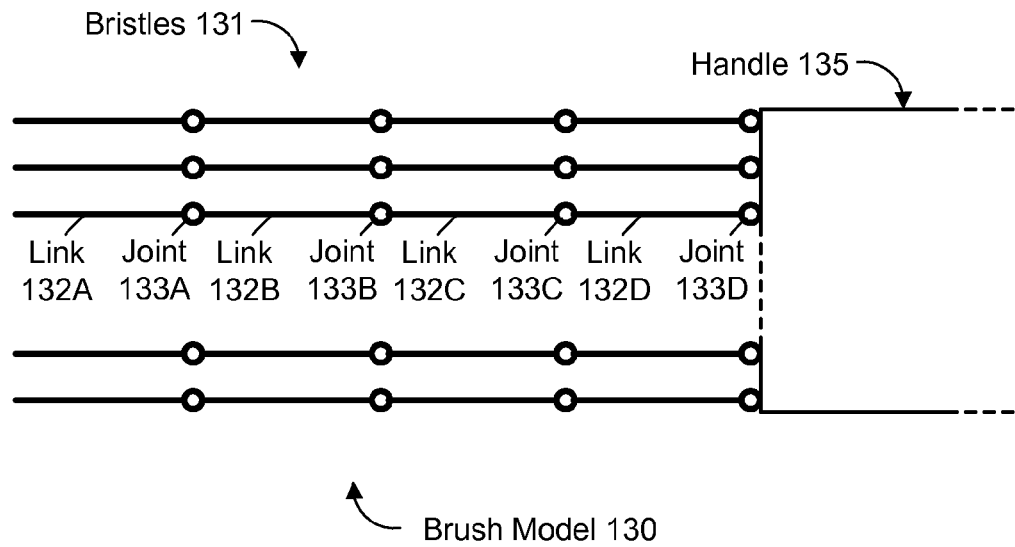
Figure 3
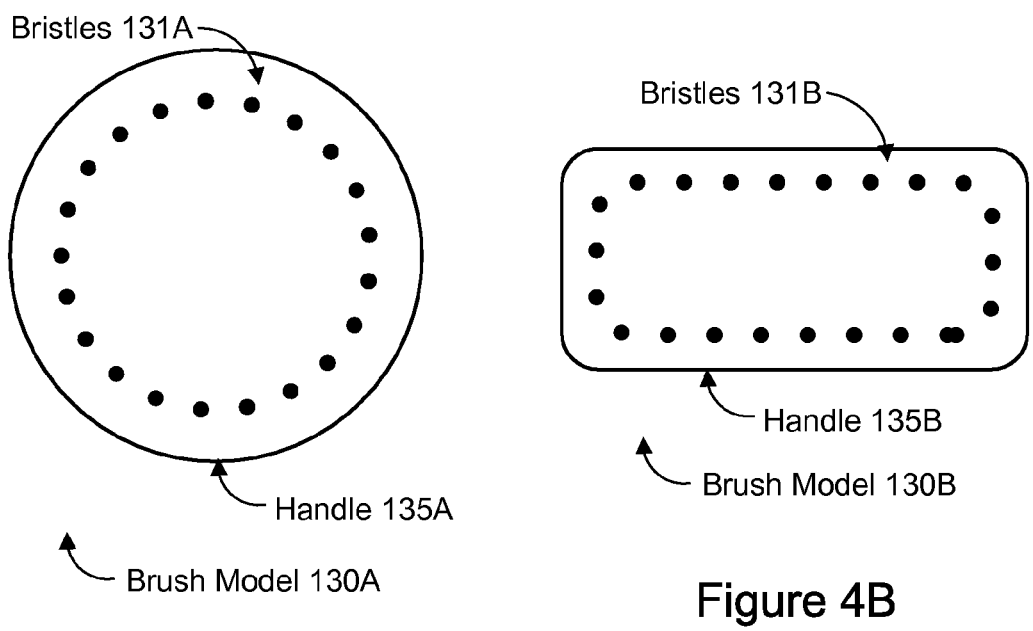
Figure 4A
Figure 4B

REALISTIC REAL-TIME SIMULATION OF BRUSH BEHAVIOR

BACKGROUND

1. Field of the Invention

The present invention is directed to computer systems; and more particularly, it is directed to the simulation of brushes for deposition of paint or ink onto a virtual canvas using computer systems.

2. Description of the Related Art

Digital image editing is the process of creating and/or modifying digital images using a computer system. Using specialized software programs, users may manipulate and transform images in a variety of ways. These digital image editors may include programs of differing complexity such as limited-purpose programs associated with acquisition devices (e.g., digital cameras and scanners with bundled or built-in programs for managing brightness and contrast); limited editors suitable for relatively simple operations such as rotating and cropping images; and professional-grade programs with large and complex feature sets.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values. Vector graphics data may be stored and manipulated as one or more geometric objects built with geometric primitives. The geometric primitives (e.g., points, lines, paths, polygons, Bezier curves, and text characters) may be based upon mathematical equations to represent parts of vector graphics data in digital images. The geometric objects may typically be located in two-dimensional or three-dimensional space. A three-dimensional object may be represented in two-dimensional space for the purposes of displaying or editing the object.

An operation often provided by a digital image editor is the use of a virtual "paintbrush" (also referred to herein as a brush) to modify a digital image by depositing virtual paint or virtual ink. Various prior approaches have attempted to model a real-world brush and its behavior in the context of such an operation. For example, a two-dimensional (2D) raster image may be created to represent the shape of the brush as it contacts the canvas, and the 2D image may be stamped repeatedly along the input path. In another approach, a vector representation of the brush tip has been used instead of a 2D raster image. However, undesirable artifacts may be created by these approaches, particularly when the stamping rate is insufficiently high.

SUMMARY

Various embodiments of systems, methods, and computer-readable storage media for simulating brush behavior are disclosed. In one embodiment, the brush behavior may be simulated substantially in real-time to deposit ink or paint onto a virtual canvas in a realistic manner. In one embodiment, user input may be received to modify an image using a brush model. The brush model may comprises data stored in a memory of a computer system. The brush model may comprise a plurality of discrete "virtual" bristles, also referred to herein as bristle representations. The user input may comprise a motion of the brush model, such as a motion between a first position (e.g., at a first simulation step) and a second position (e.g., at a second simulation step). The user input may also comprise one or more paint values representing a color of the "paint" or "ink" sought to be applied.

An effect of each of the plurality of bristle representations on the image throughout the motion may be determined. In one embodiment, a continuous stroke may be determined for each of the plurality of bristle representations (e.g., between the first simulation step and the second simulation step). In one embodiment, an approximation of a volume swept by each bristle representation between the first simulation step and the second simulation step may be determined. The approximation of the volume may be represented by a quadrilateral comprising the end points of the portion of the respective link contacting the canvas at the first simulation step and the second simulation step. The image may be modified based on the determined effect of each of the plurality of bristle representations on the image.

BRIEF DESCRIPTION OF THE DRAWINGS

FIG. 3 is a block diagram further illustrating a brush model according to one embodiment.

FIGS. 4A and 4B are block diagrams illustrating examples of brush models according to one embodiment.

Figure 1:
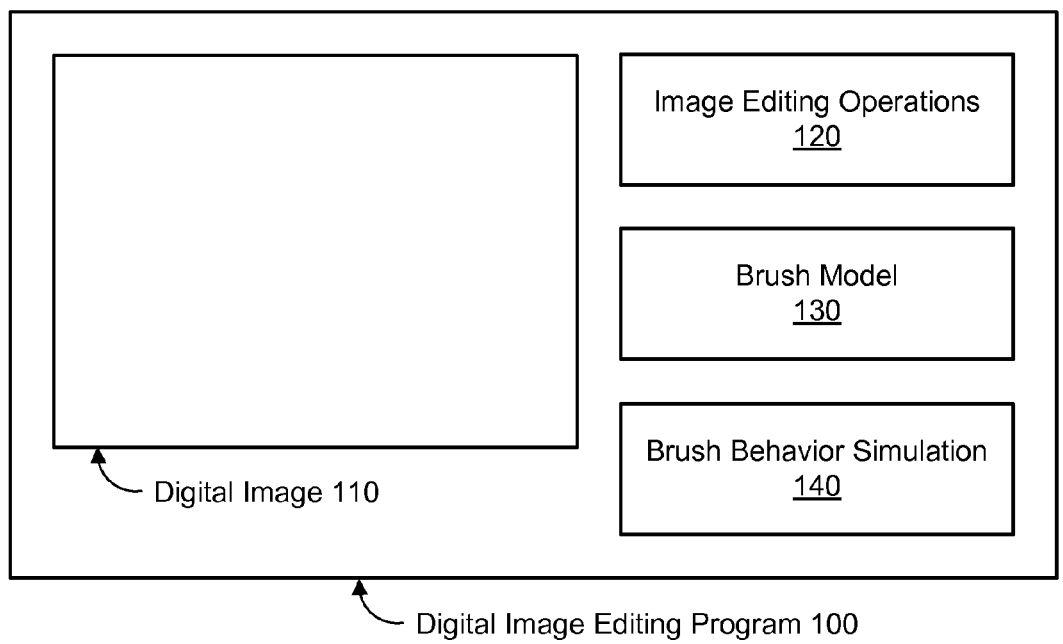
FIG. 1 is a block diagram illustrating an embodiment of a digital image editing program configured for the simulation of brushes.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Using embodiments of the systems and methods described herein, realistic brush behavior may be simulated in a painting application. In one embodiment, the brush behavior may be simulated substantially in real-time to deposit ink or paint onto a virtual canvas. A brush model may include a large set of discrete bristles. The bristles may comprise "virtual" bristles and may also be referred to herein as bristle representations. The simulated behavior of the brush may result in continuous strokes created by sweeping individual bristles into quadrilaterals. The brush model and brush behavior simulation may model the change of the shape of a brush tip during a stroking motion and the deposition of paint or ink resulting from the motion. By computing the effect of each bristle independently of other bristles, a faithful reproduction of how a real brush deposits paint or ink and changes shape during a stroke may be achieved.

FIG. 1 is a block diagram illustrating an embodiment of a digital image editing program 100 configured for use with the brush simulation techniques described herein. A digital image editing program 100, also referred to herein as an image editor 100, may be used to create and/or modify a digital image 110, also referred to herein as an image 110. The digital image editing program 100 may comprise a plurality of editing operations 120. The editing operations 120 may comprise suitable operations for modifying elements of the image 110. For example, various effects such as filters (e.g., Gaussian blur, median filter, add noise, reduce noise, fragment, unsharp mask), image adjustments (e.g., levels, curves, brightness/contrast, shadow/highlight), and other operations (e.g., resizing, cropping, thresholding, rotation, perspective distortion) may be applied to one or more images, selections within the image 110, or other suitable data related to the image 110. In one embodiment, a suitable product such as Adobe Photoshop®, Adobe Illustrator®, or Adobe AfterEffects® (available from Adobe Systems, Inc.) may be used as the image editor 100.

Using the image editor 100, a user may seek to apply pixel values (also referred to herein as "paint" or "ink") such as pixel colors and alpha (e.g., transparency) values to the digital image 110. For example, the user may desire to paint portions of the image 110 using a paintbrush provided by the editing operations 120 of the image editor 100. The digital image editing program 100 may comprise a brush model 130 that is used to model such a paintbrush. The digital image editing program 100 may also comprise instructions to implement brush behavior simulation functionality 140. As will be described in greater detail below, the brush behavior simulation functionality 140 may comprise one or more operations to simulate behavior of a paintbrush. The brush behavior simulation functionality 140 may use the brush model 130.

Figure 2:
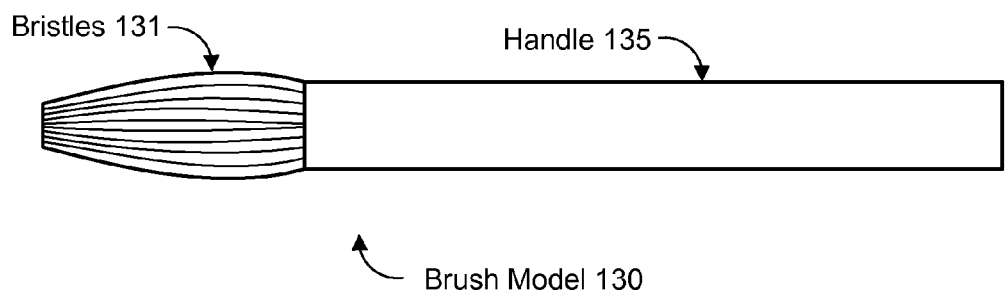
FIG. 2 is a block diagram illustrating a brush model according to one embodiment.

FIG. 2 is a block diagram illustrating a simplified brush model according to one embodiment. In one embodiment, a brush may be simulated as a set of discrete "virtual" bristles. As shown in FIG. 2, the brush model 130 may comprise a plurality of bristles 131. The plurality of bristles 131 may also be referred to herein as bristle representations 131. In one embodiment, the brush model may also comprise a brush handle 135. The brush handle 135 may also be referred to herein as a brush handle representation 135. The plurality of bristles 131 may be attached to the end of the handle 135. In one embodiment, the bristles 131 may include a sufficient number of individual bristles (e.g., 50 to 100) for accurate simulation of the behavior of a real brush.

FIG. 3 is a block diagram further illustrating a brush model according to one embodiment. Each bristle may comprise a series of links. Each link may comprise a thin cylinder such as a cylinder having a minimal (e.g., nearly zero) radius. The links in a bristle may be connected end-to-end. The connections between links may comprise ball-and-socket joints. The connections between the handle 135 and the first link in each bristle may also comprise ball-and-socket joints. The ball-and-socket joints may permit arbitrary rotational movement with three degrees of freedom (3DOF). As shown in the example of FIG. 3, one bristle may comprise a set of links 132A, 132B, 132C, 132D. The links 132A, 132B, 132C, 132D may be connected to each other by ball-and-socket joints 133A, 133B, 133C. The bristle may be connected to the brush handle 135 by an additional ball-and-socket joint 133D. In one embodiment, the number of links in a bristle may control the size of curves that the bristle can form, where the size is proportional to the length of the bristle. Tighter curves may be possible with more links, and smoother shapes may be typical with fewer links. Because "real world" brush bristles generally do not form tight curves or small loops, few links may be used for each bristle in one embodiment.

In one embodiment, motion of the brush model 130 may be determined using standard articulated rigid body dynamics with hard constraints. Thus, for each object being simulated (e.g., each link or handle), the motion may be computed as a six-degrees-of-freedom (6DOF) rigid body which is subject to the constraints imposed by the joints between objects. A real brush bristle tends to resist deformation by exerting force to restore its shape at rest (i.e., a rest shape). To simulate the stiffness of a brush bristle, each joint in the brush model 130 may exert some force. The rest shape of the bristle may be defined in terms of the rest angles of each joint. For a straight bristle, for example, each angle may be set to zero. Joint limits may be used to restrict the valid angles of each joint to zero, and a stiff constraint force may be used to restore the joint limits. Because brush bristles are a classic stiff dynamic system comprising large forces that change quickly, an implicit solver may be used to ensure stability in one embodiment.

Different types of brushes may be simulated by varying the parameters of the brush model 130. The parameters of the brush model 130 may be altered to generate different bristle materials, different configurations (e.g., arrangements) of bristles, and different types of brush deformation behavior (e.g., bristle splitting, bristle bending, etc.). FIGS. 4A and 4B are block diagrams illustrating examples of different brush types according to one embodiment. For example, a standard round brush may have bristles distributed within a circle on the handle, with the bristles in the same direction and with a tapered end. The brush model 130A shown in FIG. 4A may simulate this circular arrangement of bristles 131A attached to a handle 135A. A flat brush may have a rectangular cross section with bristles of the same length. The brush model 130B shown in FIG. 4B may simulate this arrangement of bristles 131B attached to a rectangular handle 135B. A fan brush may distribute its bristles across an arc with radial direction and uniform length. Additionally, different bristle materials (e.g., camel hair, badger, red sable, nylon, etc.) may be simulated by changing the stiffness of each joint along the bristle. For example, some fiber types may be more stiff overall, and others may be stiff at the base but become less stiff towards the tip.

In one embodiment, the brush model 130 may be used in the simulation of brush behavior (using the brush behavior simulation functionality 140). The shape formed by the bristles in contact with the canvas may be referred to as a brush contact shape. In general, the simulation of brush behavior may include sweeping the two-dimensional (2D) image of the brush contact shape along a 2D curve defined by the motion of the brush between simulation steps. Using prior approaches to create the swept area, the 2D image was stamped at substeps along the curve to approximate the solution for a number of substeps determined by a sampling rate. Use of the brush behavior simulation functionality 140 may substantially avoid the sampling artifacts found in some prior approaches which apply a stamp along a path.

In one embodiment, continuous brush strokes may be created between discrete simulation steps using the brush model 130 discussed above. Because each bristle is simulated as a series of links, the swept volume of a bristle (i.e., the volume swept by a bristle during a stroke) may be computed as the sum of the swept volumes of each link. Each link may comprise a thin cylinder that can be approximated by a line. The swept volume of the thin cylinder may be orthographically projected into 2D to determine the final canvas mark. Therefore, instead of sweeping a cylinder to generate a volume, the final mark may be approximated by sweeping a line for each cylinder to generate a quadrilateral (also referred to herein as a quad).

To sweep a line into a quad, the quad may be constructed by connecting the end points of the beginning line segments and the end points of the ending line segments. Each quad may then be orthographically projected to the canvas plane to create the final mark. To simulate the portion of each bristle that is in contact with the canvas, a height threshold may be used to clip the portion of each bristle that is not in "contact" with the canvas (i.e., above the height threshold). Using this clipping technique, the behavior of pushing the brush harder into the canvas to create a larger mark may be simulated.

Figure 5A:
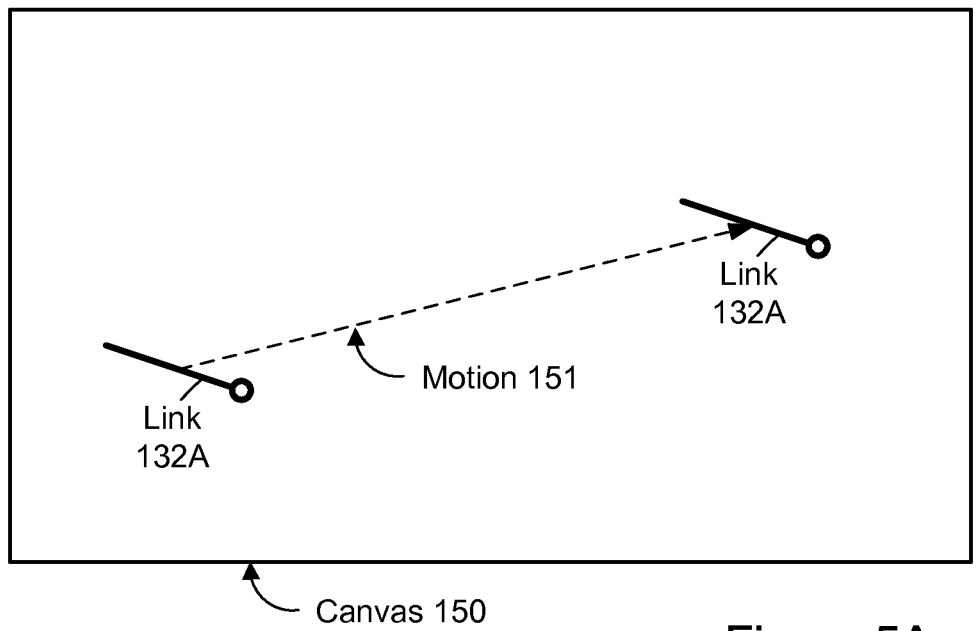
FIGS. 5A and 5B are block diagrams illustrating an example of the brush behavior simulation according to one embodiment.
Figure 5B:
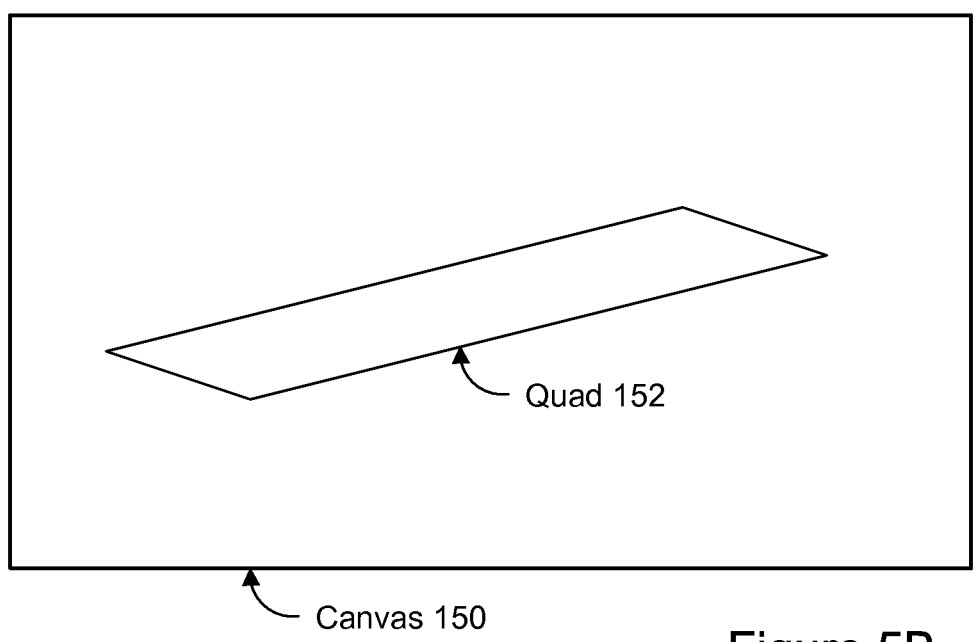

FIGS. 5A and 5B are block diagrams illustrating an example of the brush simulation according to one embodiment. FIG. 5A shows a link 132A of a bristle in "contact" with a canvas 150. The canvas 150 may represent a portion of a larger canvas. The canvas 150 is "painted" by moving the link 132A according to a particular motion 151. The two instances of the link 132A may correspond to two steps in a brush simulation. In the example shown in FIG. 5A, the entire link 132A is in contact with the canvas at both the beginning and end positions. FIG. 5B illustrates the quad 152 that is generated by the motion of the link 132A in contact with the canvas. The quad 152 may be generated by connecting the endpoints of the line segment corresponding to the link as it contacts the canvas at the two positions. A mark (also referred to as "paint" or "ink") corresponding to the quad 152, including one or more pixels with appropriate color and transparency values, may be generated in a corresponding location in the digital image 110. By generating a quad and a corresponding mark in this manner for every link in every bristle that contacts the canvas, continuous brush strokes may be created between discrete simulation steps using the brush model 130. In one embodiment, the same region of the canvas may be stroked more than once to simulate a buildup of paint or ink that results in a darker color than a single stroke.

In one embodiment, the approximation of a bristle's swept area may be inaccurate if a quadrilateral corresponding to a nearly vertical bristle is too thin to leave a mark because no pixels are hit by the projection onto the canvas. To account for this potential inaccuracy, a line segment having a width of one may be rasterized for each bristle between the end points of the bristle's last link. In this manner, each bristle in contact with the canvas may be guaranteed to make a minimum thickness mark (e.g., a mark of at least one pixel) under any deformation. Although the resulting additional pixel along the edge of the brush's mark may be incorrect when the bristle is not vertical, the error may be too small to affect the final output mark significantly.

Appropriate user input may be captured in connection with the brush behavior simulation functionality 140. For example, the user input may include a selected brush type as well as the position of the brush and the direction of its movement relative to a canvas. The user input may also include a "pressure" value that may be captured with an appropriate input device such as a tablet and/or stylus. The input pressure may be used to simulate the pressure applied to the brush. Using the brush model 130 and brush behavior simulation 140 discussed above, the input pressure may be used to deform the bristles 131 into a wide range of shapes in contact with the canvas. The shape of the brush tip may change throughout a stroke as the input pressure changes.

Figure 6:
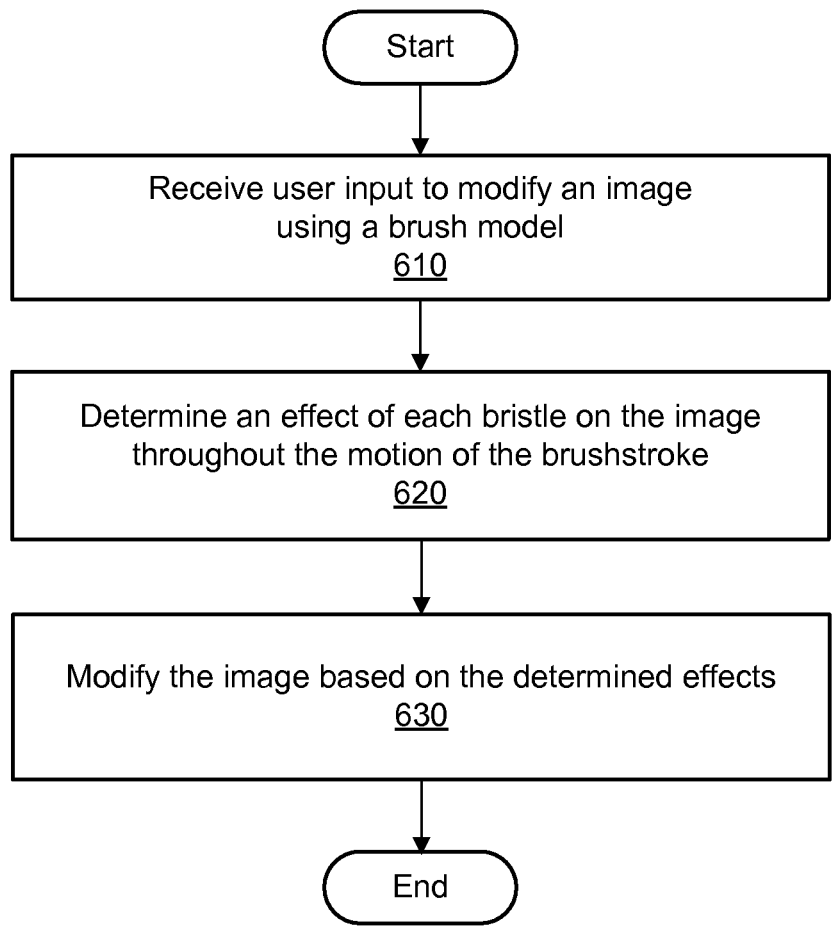
FIG. 6 is a flow diagram illustrating a method for simulating brush behavior according to one embodiment.

FIG. 6 is a flowchart illustrating a method for simulating brush behavior according to one embodiment. As shown in 610, user input may be received to modify an image using a brush model. As discussed above, the brush model may comprise a plurality of bristle representations, and each bristle representation may comprise a series of one or more links. The user input may comprise a motion of the brush model, such as a motion between a first position (e.g., at a first simulation step) and a second position (e.g., at a second simulation step). The user input may also comprise one or more paint values representing a color of the "paint" or "ink" sought to be applied.

As shown in 620, an effect (if any) of each of the plurality of bristle representations on the image throughout the motion may be determined. In one embodiment, a continuous stroke may be determined in 620 for each of the plurality of bristle representations between the first simulation step and the second simulation step. In one embodiment, an approximation of a volume swept by each bristle representation between the first simulation step and the second simulation step may be determined in 620. In one embodiment, a clipping operation may be used in 620 to determine a portion of the plurality of the bristle representations located between a canvas and a plane above the canvas.

In one embodiment, a set of the links that contact the canvas in the first simulation step and the second simulation step may be determined in 620. A quadrilateral may be determined for each link in this set of links. The quadrilateral may comprise the end points of the portion of the respective link contacting the canvas at the first simulation step and the second simulation step. The effect of the paint in each quadrilateral may then be determined.

As shown in 630, the image may be modified based on the determined effect of each of the plurality of bristle representations on the image throughout the motion. For example, color values of pixels affected by the stroke of the brush may be modified. In one embodiment, each bristle representation in "contact" with the canvas may affect at least one pixel along its path from the first simulation step to the second simulation step.

In one embodiment, a suitable simulation engine such as the Open Dynamics Engine (ODE) may be used to implement the brush model 130 and/or brush behavior simulation 140 discussed above. ODE may comprise a framework for constrained dynamics simulations. Using ODE, each of the bristles 131 may be modeled as a chain of rigid capped cylinders (e.g., capsules) connected end-to-end by rotational joints, with each bristle attached at one end to the brush handle 135. The joints may be modeled as 3DOF ball-and-socket joints. The canvas 150 may be modeled with a single plane. The bristles 131 may collide with the plane of the canvas during a stroke, and the collision may cause the brush tip to deform. The user input may be used to generate the brush position with an explicit restorative force computed at each timestep. Given the target pose (e.g., position and orientation), the force and torque needed to change the brush's current pose and momentum to the target pose may be computed directly. The computer force and torque may be applied as external forces using the simulation engine (e.g., ODE).

Restorative forces may be used in the modeling of bristles that attempt to return to a rest shape. In one embodiment, joint limits may be specified using the simulation engine (e.g., ODE) for the modeling of restorative forces. Start and stop angles may be specified for each joint using the simulation engine (e.g., ODE). By setting all the angles to the same value, the effect of a rest angle may be created. The constraint force mixing (CFM) and error reduction parameter (ERP) for a joint may be set to yield behavior equivalent to a spring-damper system, and a force limit may keep the joint from adding too much energy to the simulation at once. In simulating a spring-damper system, the forces may be integrated implicitly so that stiff bristle behavior may be simulated in real-time.

In one embodiment, explicit angular spring forces may be specified using the simulation engine (e.g., ODE) for the modeling of restorative forces. Start and stop angles may be specified for each joint using the simulation engine (e.g., ODE). By setting all the angles to the same value, the effect of a rest angle may be created. The pose of the links may be used to compute the angular spring torques manually after each simulation step. The angular spring torques may then be applied to the links as external forces.

The simulation engine (e.g., ODE) may be used to implement a constrained dynamics simulation. A constrained dynamics simulation may solve for constraint forces by creating an N·N matrix, where N is the number of degrees of freedom that are constrained. For bodies called islands that do not have constraints between them and do not interact, the matrix may be split into separate matrices for each island. Each matrix may be solved independently for a particular island. Because solving the matrix may be a problem of complexity $O(N^3)$, solving islands separately may typically be faster than solving the same bodies as one interrelated system. Therefore, the simulation of the brush behavior may be more computationally efficient if the brush bristles are separated so they are independent of one another.

As discussed above, each bristle may be connected by a joint to the same brush handle 135. However, because the handle mass may be large in comparison to the bristle mass, the error in brush pose for each frame may be very small. Thus, the brush handle 135 may be modeled as many separate brush handle bodies using the simulation engine (e.g., ODE). Each bristle may be attached to one of the separate brush handle bodies using a ball-and-socket joint. Although the computation of the force and torque necessary to move a brush handle may be performed separately for each brush handle body, such a computation is relatively inexpensive. The separation of the bristles permitted by the use of multiple brush handle bodies may permit each bristle to be solved independently. Therefore, the brush behavior simulation 140 may be both computationally efficient and scalable in a multi-processor or multi-core environment. In one embodiment, for example, 40 bristles may be simulated at 60 Hz on one core; alternatively, 75 bristles may be simulated at 30 Hz on one core.

In one embodiment, inter-bristle forces may be simulated. By including bristle-to-bristle collisions, contact joints between bristles may be created to enforce penetration constraints. By simulating inter-bristle forces, the bristles may spread and appear to maintain the volume of the brush tip more naturally when pressed into the canvas. In one embodiment, an approximation of the inter-bristle forces may be included in the brush behavior simulation 140 to achieve similar effects in a more computationally efficient manner. For example, explicit penalty forces may be added to provide similar bristle-to-bristle collision behavior without the need for additional constraints.

In one embodiment, the simulation engine (e.g., ODE) may provide various of mechanisms for enforcing constraints in the simulation. One constraint enforcement mechanism may be referred to as dWorldStep. The dWorldStep functionality may be used to construct and solve the constraint matrix in $O(N^3)$ time. Another constraint enforcement mechanism may be referred to as dWorldQuickStep. The dWorldQuickStep functionality may be used to perform iterative relaxation to approximate the correct constraint forces in $O(M\ N)$ time, where M is the number of iterations (e.g., 20). In one embodiment, the use of dWorldQuickStep in the brush behavior simulation may be faster than the use of dWorldStep. For example, for a 5-link bristle in which each joint is 3DOF, there are 15 constraints. Solving the matrix using dWorldStep may take approximately 3375 (i.e., $15^3$) units of time while solving the approximation using dWorldQuickStep may take approximately 300 (i.e., 15×20) units of time. The relative efficiency of dWorldQuickStep may be even more pronounced when inter-bristle forces are included.

Figure 7:
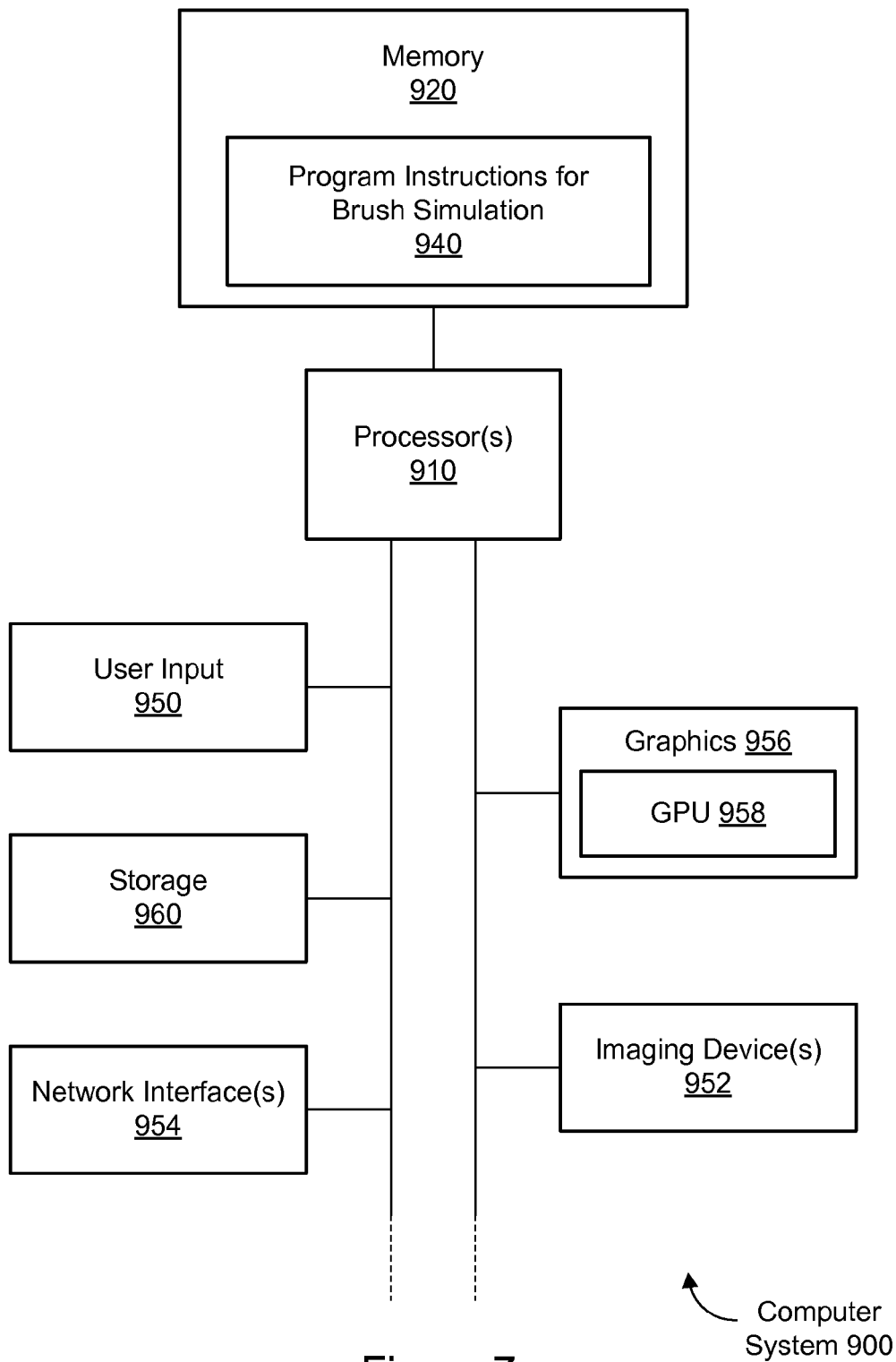
FIG. 7 is a block diagram illustrating constituent elements of a computer system that is configured to implement embodiments of the system and methods for brush simulation.

FIG. 7 is a block diagram illustrating constituent elements of a computer system 900 that is configured to implement embodiments of the systems and methods described herein. The computer system 900 may include one or more processors 910 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 900, such as various versions of Unix, Linux, Windows® from Microsoft Corporation, MacOS® from Apple Inc., or any other operating system that enables the operation of software on a hardware platform. The processor(s) 910 may be coupled to one or more of the other illustrated components, such as a memory 920, by at least one communications bus.

In one embodiment, a specialized graphics card or other graphics component 956 may be coupled to the processor(s) 910. The graphics component 956 may include a graphics processing unit (GPU) 958. Additionally, the computer system 900 may include one or more imaging devices 952. The one or more imaging devices 952 may include various types of raster-based imaging devices such as monitors and printers. In one embodiment, one or more display devices 952 may be coupled to the graphics component 956 for display of data provided by the graphics component 956.

In one embodiment, program instructions 940 that may be executable by the processor(s) 910 to implement aspects of the techniques described herein may be partly or fully resident within the memory 920 at the computer system 900 at any point in time. For example, portions of the digital image editing program 100 and its constituent elements and data (e.g., editing operations 120, brush model 130, and/or brush behavior simulation functionality 140) may be stored in the memory 920. The memory 920 may be implemented using any appropriate medium such as any of various types of ROM or RAM (e.g., DRAM, SDRAM, RDRAM, SRAM, etc.), or combinations thereof. The program instructions may also be stored on a storage device 960 accessible from the processor(s) 910. Any of a variety of storage devices 960 may be used to store the program instructions 940 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 960 may be coupled to the processor(s) 910 through one or more storage or I/O interfaces. In some embodiments, the program instructions 940 may be provided to the computer system 900 via any suitable computer-readable storage medium including the memory 920 and storage devices 960 described above.

The computer system 900 may also include one or more additional I/O interfaces, such as interfaces for one or more user input devices 950. In addition, the computer system 900 may include one or more network interfaces 954 providing access to a network. It should be noted that one or more components of the computer system 900 may be located remotely and accessed via the network. The program instructions may be implemented in various embodiments using any desired programming language, scripting language, or combination of programming languages and/or scripting languages, e.g., C, C++, C#, Java™, Perl, etc. The computer system 900 may also include numerous elements not shown in FIG. 7, as illustrated by the ellipsis.

In various embodiments, the elements shown in FIG. 6 may be performed in a different order than the illustrated order. In FIG. 6, any of the operations described in the elements may be performed programmatically (i.e., by a computer according to a computer program). In FIG. 6, any of the operations described in the elements may be performed automatically (i.e., without user intervention).

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
receiving user input to modify an image using a brush model, the brush model comprising data stored in a memory of a computer system and a plurality of bristle representations, each of the plurality of bristle representations being configured to model a respective individual bristle comprising a series of one or more links connected end-to-end, the brush model further comprising a brush handle representation modeled as a plurality of brush handle bodies, one or more of the plurality of handle bodies being attached to one or more of the plurality of bristle representations, the user input comprising a motion of the brush model;
performing a plurality of independent simulations for the plurality of bristle representations, the plurality of independent simulations being divided by way of the plurality of brush handle bodies to permit each respective individual bristle to be solved independently, each said independent simulation being performed for the respective individual bristle of the brush model by at least:
independently determining one or more forces acting on the respective individual bristle;
independently determining a collision between a canvas and the respective individual bristle if the respective individual bristle contacts the canvas; and
independently determining an individual effect of the respective individual bristle on the image throughout the motion; and
modifying the image based on the determined individual effects of the individual bristles on the canvas throughout the motion.

2. The method as recited in claim 1, wherein the motion of the brush model comprises a motion between a first simulation step and a second simulation step, wherein independently determining the individual effect of the respective individual bristle on the image throughout the motion comprises determining a continuous stroke for the respective individual bristle between the first simulation step and the second simulation step.

3. The method as recited in claim 1, wherein the motion of the brush model comprises a motion between a first simulation step and a second simulation step, wherein independently determining the individual effect of the respective individual bristle on the image throughout the motion comprises determining an approximation of a volume swept by the respective individual bristle between the first simulation step and the second simulation step.

4. The method as recited in claim 1, wherein the user input comprises a paint value, wherein the motion of the brush model comprises a motion between a first simulation step and a second simulation step, wherein independently determining the individual effect of the respective individual bristle on the image throughout the motion comprises:
determining a set of the links that contact the canvas in the first simulation step and the second simulation step;
determining a quadrilateral for each link in the set of links, wherein the quadrilateral comprises end points of the portion of the respective link contacting the canvas at the first simulation step and the second simulation step; and
determining the effect of the paint in each quadrilateral.

5. The method as recited in claim 1, wherein independently determining the individual effect of the respective individual bristle on the image throughout the motion comprises using a clipping operation to determine a portion of the respective individual bristle located between the canvas and a plane above the canvas.

6. The method as recited in claim 1, wherein the one or more links in each bristle representation are connected end-to-end by ball-and-socket joints, and wherein each bristle representation is connected to the brush handle representation by a ball-and-socket joint.

7. The method as recited in claim 6, wherein a bristle stiffness is simulated by determining a restorative force for each of the joints.

8. The method as recited in claim 1, further comprising modifying a bristle material of the brush model.

9. The method as recited in claim 1, further comprising modifying a bristle configuration of the brush model.

10. The method as recited in claim 1, further comprising modifying a deformation behavior of the brush model.

11. A non-transitory, computer-readable storage medium, storing program instructions that are computer-executable to implement operations including:
receiving user input to modify an image using a brush model, the brush model comprising data stored in a memory of a computer system and a plurality of bristle representations, each of the plurality of bristle representations being configured to model a respective individual bristle comprising a series of one or more links connected end-to-end, the brush model further comprising a brush handle representation that is modeled as a plurality of brush handle bodies, one or more of the plurality of brush handle bodies being attached to one or more of the plurality of bristle representations, the user input comprising a motion of the brush model;
performing a plurality of independent simulations that are each performed for a respective individual bristle by at least using the plurality of brush handle bodies to separate the respective individual bristles and allow each respective individual bristle to be solved independently, said performing including:
independently determining one or more forces acting on the respective individual bristle;
independently determining a collision between a canvas and the respective individual bristle if the respective individual bristle contacts the canvas; and
independently determining an individual effect of the respective individual bristle on the image throughout the motion; and
modifying the image based on the determined individual effects of the individual bristles on the canvas throughout the motion.

12. The non-transitory, computer-readable storage medium as recited in claim 11, wherein the motion of the brush model comprises a motion between a first simulation step and a second simulation step, wherein independently determining the individual effect of the respective individual bristle on the image throughout the motion comprises determining a continuous stroke for the respective individual bristle between the first simulation step and the second simulation step.

13. The non-transitory, computer-readable storage medium as recited in claim 11, wherein the motion of the brush model comprises a motion between a first simulation step and a second simulation step, wherein independently determining the individual effect of the respective individual bristle on the image throughout the motion comprises determining an approximation of a volume swept by the respective individual bristle between the first simulation step and the second simulation step.

14. The non-transitory, computer-readable storage medium as recited in claim 11, wherein the user input comprises a paint value, wherein the motion of the brush model comprises a motion between a first simulation step and a second simulation step, wherein independently determining the individual effect of the respective individual bristle on the image throughout the motion comprises:
  determining a set of the links that contact the canvas in the first simulation step and the second simulation step;
  determining a quadrilateral for each link in the set of links, wherein the quadrilateral comprises end points of the portion of the respective link contacting the canvas at the first simulation step and the second simulation step; and
  determining the effect of the paint in each quadrilateral.

15. The non-transitory, computer-readable storage medium as recited in claim 11, wherein independently determining the individual effect of the respective individual bristle on the image throughout the motion comprises using a clipping operation to determine a portion of the respective individual bristle located between the canvas and a plane above the canvas.

16. The non-transitory, computer-readable storage medium as recited in claim 11, wherein the one or more links in each bristle representation are connected end-to-end by ball-and-socket joints, and wherein each bristle is connected to the brush handle representation by a ball-and-socket joint.

17. The non-transitory, computer-readable storage medium as recited in claim 16, wherein a bristle stiffness is simulated by determining a restorative force for each of the joints.

18. The non-transitory, computer-readable storage medium as recited in claim 11, wherein the operations further include modifying a bristle material of the brush model.

19. The non-transitory, computer-readable storage medium as recited in claim 11, wherein the operations further include modifying a bristle configuration of the brush model.

20. The non-transitory, computer-readable storage medium as recited in claim 11, wherein operations further include modifying a deformation behavior of the brush model.

21. A system, comprising:
  at least one processor;
  a memory coupled to the at least one processor and configured to store program instructions and a brush model, the program instructions being executable by the at least one processor to:
    receive user input to modify an image using the brush model, the brush model comprising a plurality of bristle representations that each model a respective individual bristle comprising a series of one or more links connected end-to-end, the brush model further comprising a brush handle representation that is modeled as a plurality of brush handle bodies, one or more of the brush handle bodies being attached to one or more of the plurality of bristle representations, the user input comprising a motion of the brush model;
    perform a plurality of independent simulations for each respective individual bristle, the plurality of independent simulations being divided based on the plurality of brush handle bodies to permit each respective individual bristle to be solved independently, by at least:
      independently determining one or more forces acting on the respective individual bristle;
      independently determining a collision between a canvas and the respective individual bristle if the respective individual bristle contacts the canvas; and
      independently determining an individual effect of the respective individual bristle on the image throughout the motion; and
    modify the image based on the determined individual effects of the individual bristles on the canvas throughout the motion.

22. The system as recited in claim 21, wherein the motion of the brush model comprises a motion between a first simulation step and a second simulation step, and wherein the individual effect of the respective individual bristle on the image throughout the motion is determined based on a continuous stroke for the respective individual bristle between the first simulation step and the second simulation step.

23. The system as recited in claim 21, wherein the motion of the brush model comprises a motion between a first simulation step and a second simulation step, and wherein the individual effect of the respective individual bristle on the image throughout the motion is determined based on an approximation of a volume swept by the respective individual bristle between the first simulation step and the second simulation step.

24. The system as recited in claim 21, wherein the user input comprises a paint value, wherein the motion of the brush model comprises a motion between a first simulation step and a second simulation step, and wherein the individual effect of the respective individual bristle on the image throughout the motion is determined based on:
  a set of the links that contact the canvas in the first simulation step and the second simulation step;
  a quadrilateral for each link in the set of links, wherein the quadrilateral comprises end points of the portion of the respective link contacting the canvas at the first simulation step and the second simulation step; and
  an effect of the paint in each quadrilateral.

25. The system as recited in claim 21, wherein the individual effect of each of the plurality of bristle representations on the image throughout the motion is determined based on a clipping operation to determine a portion of the plurality of the bristle representations located between the canvas and a plane above the canvas.

26. The system as recited in claim 21, wherein the one or more links in each bristle representation are connected end-to-end by ball-and-socket joints, and wherein each bristle representation is connected to the brush handle representation by a ball-and-socket joint.

27. The system as recited in claim 26, wherein a bristle stiffness is simulated by determining a restorative force for each of the joints.

28. The system as recited in claim 21, wherein the program instructions are further executable by the at least one processor to modify a bristle material of the brush model.

29. The system as recited in claim 21, wherein the program instructions are further executable by the at least one processor to modify a bristle configuration of the brush model.

30. The system as recited in claim 21, wherein the program instructions are further executable by the at least one processor to modify a deformation behavior of the brush model.

* * * * *